3,151,163
SEPARATION OF AMINES FROM CAUSTIC AND SALT
Edward M. Nussbaum, Lake Jackson, Tex., assignor to The Dow Chemical Company, Midland, Mich., a corporation of Delaware
No Drawing. Filed Dec. 14, 1959, Ser. No. 859,107
2 Claims. (Cl. 260—583)

The present invention relates to the recovery of alkylenediamines and polyalkylene polyamines and is more particularly concerned with the recovery of these amines from mixtures of the same containing salt and aqueous caustic, i.e., production reaction mixture.

Presently known methods for the recovery of these amines from aqueous salt-caustic mixtures, prepared, for example, by the direct amination of aliphatic chlorides or dichlorides, from which the amine hydrochlorides are neutralized with strong caustic to form the amine and large quantities of water and salt, require prolonged heating of the solutions containing the amines. This necessarily creates unfavorable conditions since most amines are heat-sensitive and polymerization, deterioration and degradation occur, producing undesirable side products. Further to complicate these processes, when short high-temperature heat is employed, in addition to degradation, there is a marked increase in the corrosion activity of the caustic and brine. Another disadvantage to present day systems is the fact that the salt which forms on neutralization is strongly attracted to the amine thus, no definitive layer of amines forms. It would, therefore, be desirable to provide a process for the recovery of the amines which would be conducted at low temperatures, thereby alleviating the corrosion problems and the degradation of the amines.

It has now been found that the addition of small amounts of ammonia to the alkylenediamine, and/or polyalkylenepolyamine-containing salt-caustic solution will release the amines in a recoverable form at temperatures only slightly above room temperature. Temperatures somewhat higher may be employed but are usually unnecessary when operating in accordance with the present invention. Thus one can employ temperatures between about room temperature (20°–25° C.) and about 120° C. Preferably however, temperatures between about 40° C. and 80° C. are employed. The lower temperatures are preferred because corrosion of equipment is less at the lower temperatures. Good recovery results are obtained when employing from 0.05 to about 20% by weight of ammonia based on the amine-containing solution. Employment of more than 20% of ammonia is neither economical nor essential for the operation of the present invention.

The alylenediamines, and/or polyalkylenepolyamines which can be separated in the manner of the present invention are those having the general formula $$H_2N(C_nH_{2n}NH)_mH$$

wherein $n$ represents an integer from 2 to 6, inclusive, and $m$ represents an integer from 1 to 4 or more. Thus one can separate ethylenediamine, 1,3-diaminopropane, 1,2-propylenediamine, 1,2-butylenediamine, 1,3-butylenediamine, 1,4-butylenediamine, 2,3-butylenediamine, 1,2-; 1,3-; 1,4-; 1,5-; 2,3-; and 2,4-pentylenediamine, 1,2-; 1,3-; 1,4-; 1,5-; 1,6-; 2,3-; 2,4-; 2,5-; and 3,4-hexylenediamine; the corresponding polyamines wherein the $m$ of the above formula is 2 or more such as, for example, diethylenetriamines, dipropylenetriamines, dibutylenetriamines, dipentylenetriamines, dihexylenetriamines, triethylenetetraamines, tripropylenetetramines, tributylenetetramines, tripentylenetetramines, trihexyenetetramines, tetraethylenepentamines, tetrapropylenepentamines, tetrabutylenepentamines, tetrapentylenepentamines and tetrahexylenepentamines, or mixtures thereof from the salt-caustic reaction solution. These amines can be prepared in the manner of U.S. Patents Nos. 2,006,058, 2,028,041; 2,049,467, 2,113,640, or 2,769,841.

In carrying out the process of the present invention, ammonia (anhydrous or aqueous) is added to an alkyleneamine-containing aqueous salt-caustic solution and the mixture heated to between about 40° and 120° C. Upon standing after heating, the amines form a clearly defined separate layer which can be recovered by conventional means such as decantation, siphoning or the like.

The following examples are illustrative of the present invention but are not to be construed as limiting.

*Example 1(A)*

To a mixture consisting of 15% of ethylenepolyamines (containing 65% ethylenediamine, 21% diethylenetriamine, 10% triethylenetetramine, and 4% higher), 20% of salt (NaCl) and 65% of aqueous 50% caustic (NaOH) was added 2% by volume of 25% aqueous ammonia. When heated to 108° C. there was a noticeable but small amine phase. Cooling to 60° C. and addition of 18% by volume of aqueous 25% ammonia gave a well defined amine layer which was decantable from the aqueous salt-caustic phase. This layer represented more than 95% of the amines in the starting mixture.

*Example 1(B)*

A mixture similar to that of Example 1(A) except that it contained no ammonia was heated to 110° C. and the amine layer which formed was decanted. This operation resulted in the recovery of only 35% of the amine in the starting mixture.

*Example 2*

0.1% by weight of anhydrous ammonia was added to a mixture similar to that employed in Example 1(A) and the mixture maintained at 110° C. until a clearly defined layer of amine formed. There was obtained, upon decantation, 95% of the amine in the starting mixture.

*Example 3*

In the manner of Example 2, the amine-containing mixture of Example 1 was heated to 60° C. and 1.0% by weight of anhydrous ammonia added. The amine layer which formed and separated contained 95% of the amine in the starting mixture.

The amine-caustic-salt solution employed as a starting material is prepared by any of the well known methods, such as those described in the U.S. Patents Nos. 2,006,058; 2,028,041; 2,049,467, 2,113,640; or 2,769,841, and generally by the direct amination of aliphatic chlorides and dichlorides to produce the amine hydrochlorides. This latter product is usually neutralized with a strong base, such as caustic alkali, to form the amines from the hydrochloride.

This application is a continuation-in-part of my copending application Serial No. 726,050, filed Apr. 3, 1958, now abandoned.

I claim:

1. In the process for preparing amines by direct amination of aliphatic chlorides and subsequent neutralization of the reaction mixture with a strong base to form a reaction mixture containing primarily an aqueous mixture of amine, chloride salt of the base and the base, the improvement comprising: treating the mixture with at least 0.05 percent of ammonia at a temperature of from about 20° to about 120° C. to cause the mixture to separate into an amine layer and an aqueous layer and separating the amine layer which forms therefrom.

2. The process set forth in claim 1 wherein the temperature during treatment with ammonia is at least 40° C.

References Cited in the file of this patent

UNITED STATES PATENTS

| | | |
|---|---|---|
| 2,028,041 | Bersworth | Jan. 14, 1936 |
| 2,922,818 | Spielberger et al. | Jan. 26, 1960 |